US010956046B2

(12) United States Patent
Gupta et al.

(10) Patent No.: US 10,956,046 B2
(45) Date of Patent: Mar. 23, 2021

(54) DYNAMIC I/O LOAD BALANCING FOR ZHYPERLINK

(71) Applicant: International Business Machines Corporation, Armonk, NY (US)

(72) Inventors: Lokesh M. Gupta, Tucson, AZ (US); Kevin J. Ash, Tucson, AZ (US); Matthew G. Borlick, Tucson, AZ (US); Kyler A. Anderson, Sahuarita, AZ (US)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 16/153,738

(22) Filed: Oct. 6, 2018

(65) Prior Publication Data

US 2020/0110542 A1    Apr. 9, 2020

(51) Int. Cl.
*G06F 3/06* (2006.01)
*G06F 12/0868* (2016.01)

(52) U.S. Cl.
CPC .......... *G06F 3/0611* (2013.01); *G06F 3/0653* (2013.01); *G06F 3/0683* (2013.01); *G06F 12/0868* (2013.01)

(58) Field of Classification Search
CPC .... G06F 3/0611; G06F 3/0653; G06F 3/0683; G06F 12/0868
See application file for complete search history.

(56) References Cited

U.S. PATENT DOCUMENTS

| 6,879,939 B1* | 4/2005 | Lang .............. G01R 31/31715 702/186 |
| 7,171,338 B1* | 1/2007 | Goguen ............. G06F 11/3414 702/186 |
| 8,375,187 B1 | 2/2013 | Chilton et al. |

(Continued)

FOREIGN PATENT DOCUMENTS

CN    106873907 A    6/2017

OTHER PUBLICATIONS

Gulati, Ajay, et al., "BASIL: Automated IO Load Balancing Across Storage Devices," FAST'10 Proceedings of the 8th USENIX conference on File and storage technologies, San Jose, California, Feb. 23-26, 2010.

*Primary Examiner* — Charles Rones
*Assistant Examiner* — Hewy H Li
(74) *Attorney, Agent, or Firm* — Nelson and Nelson; Daniel P. Nelson

(57) ABSTRACT

A method for dynamically balancing I/O workload is disclosed. In one embodiment, such a method includes transmitting, from a host system to a storage system, read requests and write requests over a communication path, such as a zHyperLink communication path. The method further determines whether first and second sets of conditions (e.g., read cache hit ratio, read and write response times, read and write reject rates, etc.) are satisfied on one or more of the host system and storage system. In the event the first set of conditions is satisfied, the method increases a ratio of read requests to write requests that are transmitted over the (Continued)

communication path. In the event the second set of conditions is satisfied, the method decreases the ratio of read requests to write requests that are transmitted over the communication path. A corresponding system and computer program product are also disclosed.

20 Claims, 8 Drawing Sheets

(56) References Cited

U.S. PATENT DOCUMENTS

| | | | |
|---|---|---|---|
| 9,870,434 B1 | 1/2018 | Ratsaby et al. | |
| 9,934,174 B2* | 4/2018 | Kachare | G06F 13/4282 |
| 10,254,970 B1* | 4/2019 | Martin | G06F 3/0611 |
| 2007/0079099 A1* | 4/2007 | Eguchi | G06F 3/0631 |
| | | | 711/170 |
| 2012/0124294 A1* | 5/2012 | Atkisson | H04L 12/403 |
| | | | 711/135 |
| 2012/0284460 A1* | 11/2012 | Guda | G06F 3/061 |
| | | | 711/114 |
| 2014/0229638 A1* | 8/2014 | Zhou | G06F 3/0635 |
| | | | 710/38 |
| 2014/0325164 A1* | 10/2014 | Thompson | G06F 3/0611 |
| | | | 711/154 |
| 2015/0242132 A1* | 8/2015 | Brooker | G06F 3/0611 |
| | | | 711/102 |
| 2015/0280959 A1 | 10/2015 | Vincent | |
| 2015/0293945 A1 | 10/2015 | Amrhein et al. | |
| 2016/0179711 A1* | 6/2016 | Oikarinen | G06F 3/061 |
| | | | 710/40 |
| 2016/0231948 A1* | 8/2016 | Gupta | G06F 3/067 |
| 2017/0272209 A1 | 9/2017 | Yanovsky et al. | |
| 2018/0189175 A1* | 7/2018 | Ji | G06F 3/0611 |
| 2018/0322066 A1* | 11/2018 | Wasiq | G06F 11/3466 |
| 2020/0057579 A1* | 2/2020 | Mathews | G06F 3/0673 |

* cited by examiner

DYNAMIC I/O LOAD BALANCING FOR ZHYPERLINK

BACKGROUND

Field of the Invention

This invention relates to systems and methods for balancing I/O when using zHyperLink and other similar I/O processing technologies.

Background of the Invention

When an I/O request is performed by an application, several processes may be performed to complete the request. These processes affect I/O latency, which can be a significant part of application response time. zHyperLink is a technology designed to reduce I/O latency by providing a fast, reliable, and direct communication path between a host system and storage system. This is accomplished by installing zHyperLink adapters on the z/OS host system and storage system, and connecting the components together using zHyperLink cables. This configuration creates a point-to-point connection between the host system and storage system, which reduces I/O response times by up to ten times compared to z High-Performance FICON® (zHPF). Such low response times are achieved by using synchronous I/O requests, which reduce the amount of time required for some functions, such as I/O interrupts and z/OS dispatch operations.

Standard I/O processing that is available using technologies, such as zHPF, requires I/O operations to perform a series of time-consuming tasks, such as z/OS dispatching, interrupt handling, CPU queuing, and L1/L2 processor cache reloading. These tasks and others required for I/O processing may cause I/O response times to be relatively long compared to transferring data within virtual storage, with response times of 130+ microseconds plus interrupt handling and CPU dispatch time.

Using zHyperLink, when a synchronous I/O is performed, the CPU on the host system waits or "spins" until the I/O is complete, or a timeout value is reached. zHyperLink can significantly reduce the time that is required to complete the I/O because the dispatching, interrupt handling, CPU queue time, and CPU cache reload activities are no longer necessary. This saves the processor time associated with two context swaps involved in a normal I/O operation, putting the thread to sleep and then re-dispatching it, as well as performing the I/O interrupt.

In order to achieve the improved I/O response times associated with synchronous I/O, the code path used to process the I/O needs to be highly optimized. Any conditions that delay a synchronous I/O operation, such as a cache miss, may cause a notification to be returned to a host system and the operation to be retried using a slower communication path such as zHPF. Synchronous I/O is only successful when microcode can complete a synchronous I/O operation in a very short amount of time, such as 10-30 microseconds. If the synchronous I/O operation cannot be completed in that amount of time, it may fail and the host system may need to retry the operation over a non-optimal path such as FICON.

Reads and writes performed using synchronous I/O typically compete for the same set of resources. Under some conditions, it may be advantageous to execute more writes than reads over a zHyperLink path. Under other conditions, it may be advantageous to execute more reads than writes over the same zHyperLink path. Systems and methods are needed to detect such conditions and communicate information about the conditions to a host system so that the host system can adjust the ratio of reads and writes accordingly.

SUMMARY

The invention has been developed in response to the present state of the art and, in particular, in response to the problems and needs in the art that have not yet been fully solved by currently available systems and methods. Accordingly, systems and methods have been developed to dynamically balance I/O workload. The features and advantages of the invention will become more fully apparent from the following description and appended claims, or may be learned by practice of the invention as set forth hereinafter.

Consistent with the foregoing, a method for dynamically balancing I/O workload is disclosed. In one embodiment, such a method includes transmitting, from a host system to a storage system, read requests and write requests over a communication path, such as a zHyperLink communication path. The method further determines whether first and second sets of conditions (e.g., read cache hit ratio, read and write response times, read and write reject rates, etc.) are satisfied on one or more of the host system and storage system. In the event the first set of conditions is satisfied, the method increases a ratio of read requests to write requests that are transmitted over the communication path. In the event the second set of conditions is satisfied, the method decreases the ratio of read requests to write requests that are transmitted over the communication path.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

Figure 1:
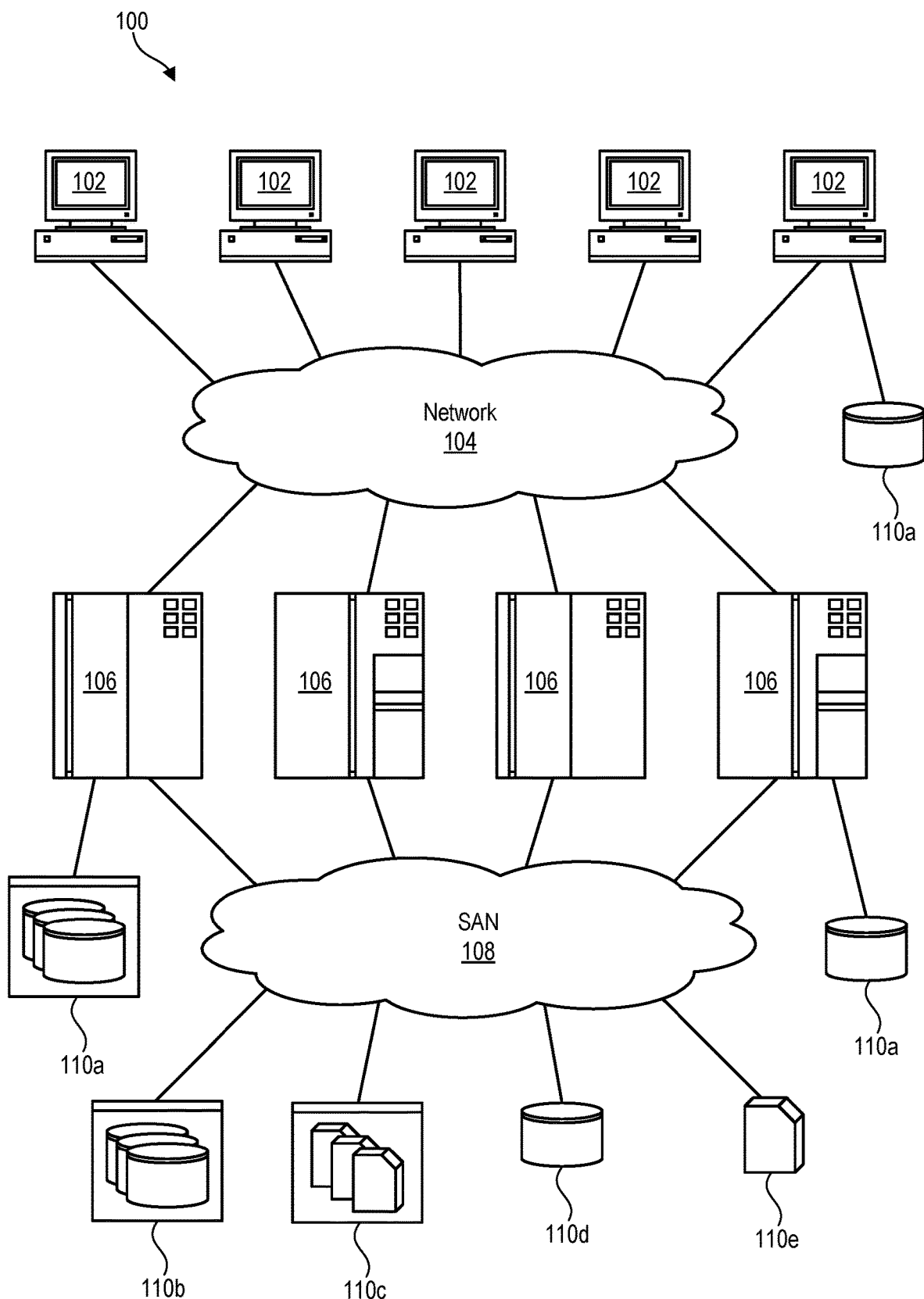
FIG. 1 is a high-level block diagram showing one example of a network environment in which systems and methods in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where systems and methods in accordance with the invention may be implemented. The network environment 100 is presented by way of example and not limitation. Indeed, the systems and methods disclosed herein may be applicable to a wide variety of different network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 110a (e.g., arrays of hard-disk drives, solid-state drives, tape drives, etc.). These computers 102, 106 and direct-attached storage systems 110a may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110b of hard-disk drives or solid-state drives, tape libraries 110c, individual hard-disk drives 110d or solid-state drives 110d, tape drives 110e, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC).

Figure 2:
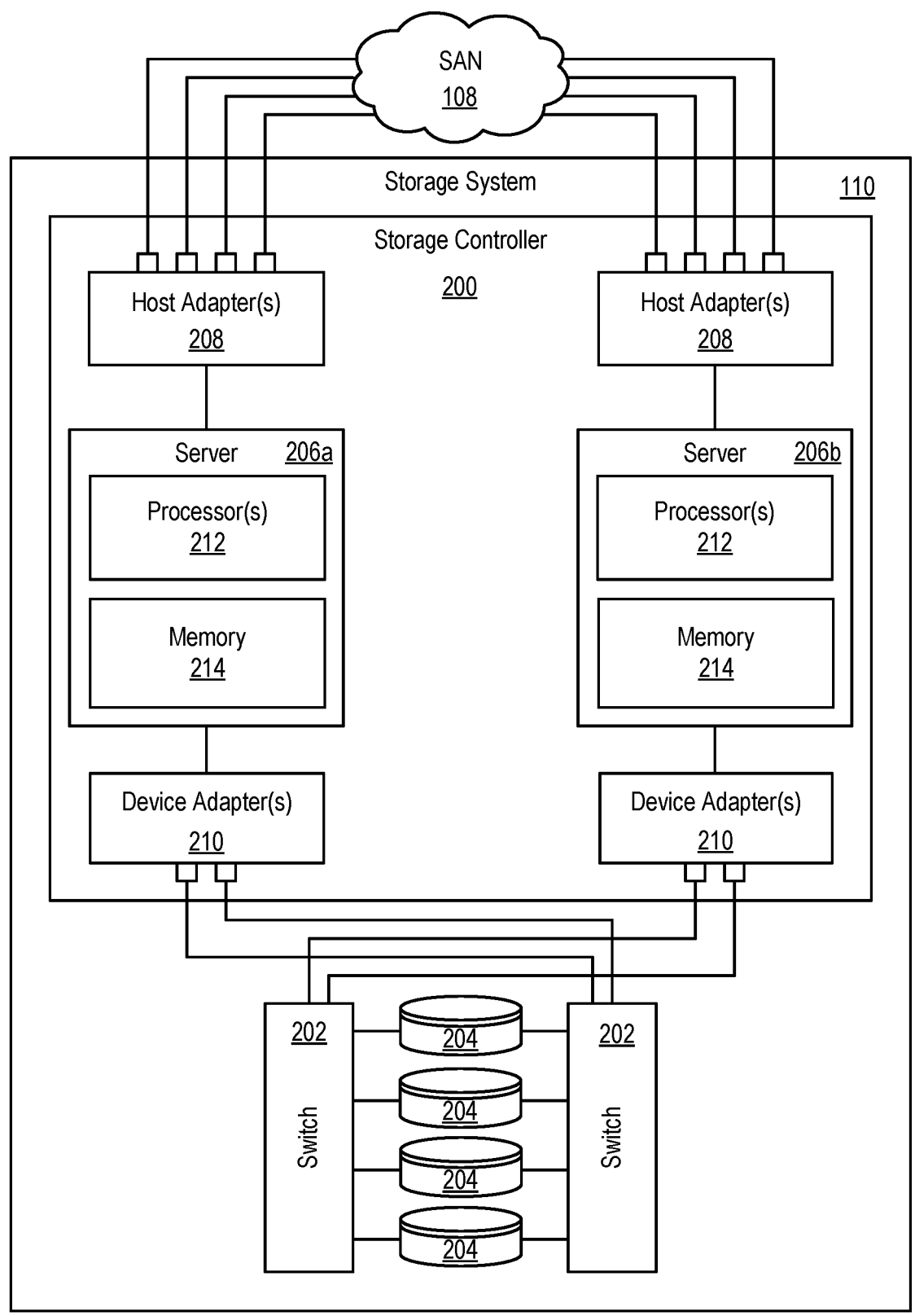
FIG. 2 is a high-level block diagram showing one example of a storage system in the network environment of FIG. 1.

Referring to FIG. 2, one embodiment of a storage system 110 containing an array of hard-disk drives 204 and/or solid-state drives 204 is illustrated. As shown, the storage system 110 includes a storage controller 200, one or more switches 202, and one or more storage drives 204, such as hard disk drives 204 or solid-state drives 204 (such as flash-memory-based drives 204). The storage controller 200 may enable one or more hosts 106 (e.g., open system and/or mainframe servers 106 running operating systems such z/OS, zVM, or the like) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. These software modules may manage all read and write requests to logical volumes in the storage drives 204.

One example of a storage system 110 having an architecture similar to that illustrated in FIG. 2 is the IBM DS8000™ enterprise storage system. The DS8000™ is a high-performance, high-capacity storage controller providing disk storage that is designed to support continuous operations. Nevertheless, the systems and methods disclosed herein are not limited to operation with the IBM DS8000™ enterprise storage system 110, but may operate with any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented by way of example and is not intended to be limiting.

Figure 3:
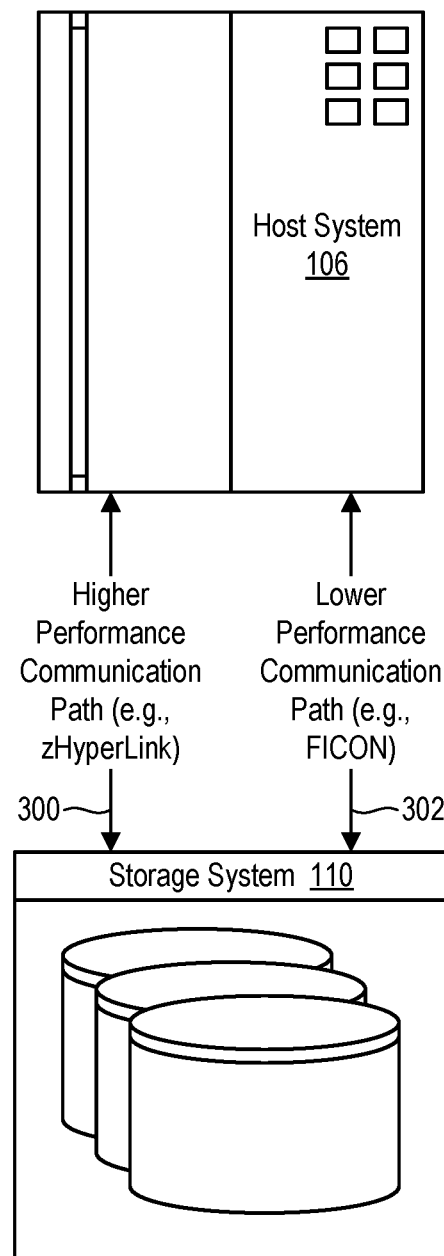
FIG. 3 is a high-level block diagram showing different communication paths between a host system and a storage system.

Referring to FIG. 3, when an I/O request is performed by an application residing on a host system 106, several processes may be performed to complete the request. These processes may affect I/O latency and application response time. zHyperLink is a technology designed to reduce I/O latency by providing a fast, reliable, and direct communication path between a host system and storage system 110. This may be accomplished by installing zHyperLink adapters on the host system 106 and storage system 110, and connecting the components using zHyperLink cables. This configuration creates a point-to-point connection 300 between the host system 106 and the storage system controller 200. This may reduce I/O response times by up to ten times compared to using a conventional communication path 302, such as a z High-Performance FICON® (zHPF) communication path 302. Such low response times may be achieved by using synchronous I/O requests, which reduce the amount of time required for some functions, such as I/O interrupts and I/O dispatch operations.

Standard I/O processing that is available using technologies, such as zHPF, requires I/O operations to perform a series of time-consuming tasks, such as z/OS dispatching, interrupt handling, CPU queueing, and L1/L2 processor cache reloading. These tasks and others required for I/O processing may cause I/O response times to be relatively long compared to transferring data within virtual storage, with response times of 130+ microseconds plus interrupt handling and CPU dispatch time.

Using zHyperLink, when a synchronous I/O is performed, the CPU on the host system 106 may wait or "spin" until the I/O is complete, or a timeout value is reached. zHyperLink can significantly reduce the time that is required to complete the I/O because the dispatching, interrupt handling, CPU queue time, and CPU cache reload activities are no longer necessary. This reduces processor time needed to perform two context swaps in a normal I/O operation, putting the thread to sleep and then re-dispatching it, as well as performing the I/O interrupt.

In order to achieve the improved I/O response times associated with synchronous I/O, the code path used to process the I/O needs to be highly optimized. Any conditions that delay a synchronous I/O operation, such as a cache miss, may cause a notification to be returned to a host system 106 and the operation to be retried using a slower communication path 302 such as zHPF. Synchronous I/O is only successful when microcode can complete a synchronous I/O operation in a very short amount of time, such as 10-30 microseconds. If a synchronous I/O operation cannot be completed in that amount of time, the synchronous I/O operation may be failed and the host system 106 may retry the operation over a non-optimal path 302 such as FICON.

Figure 4:
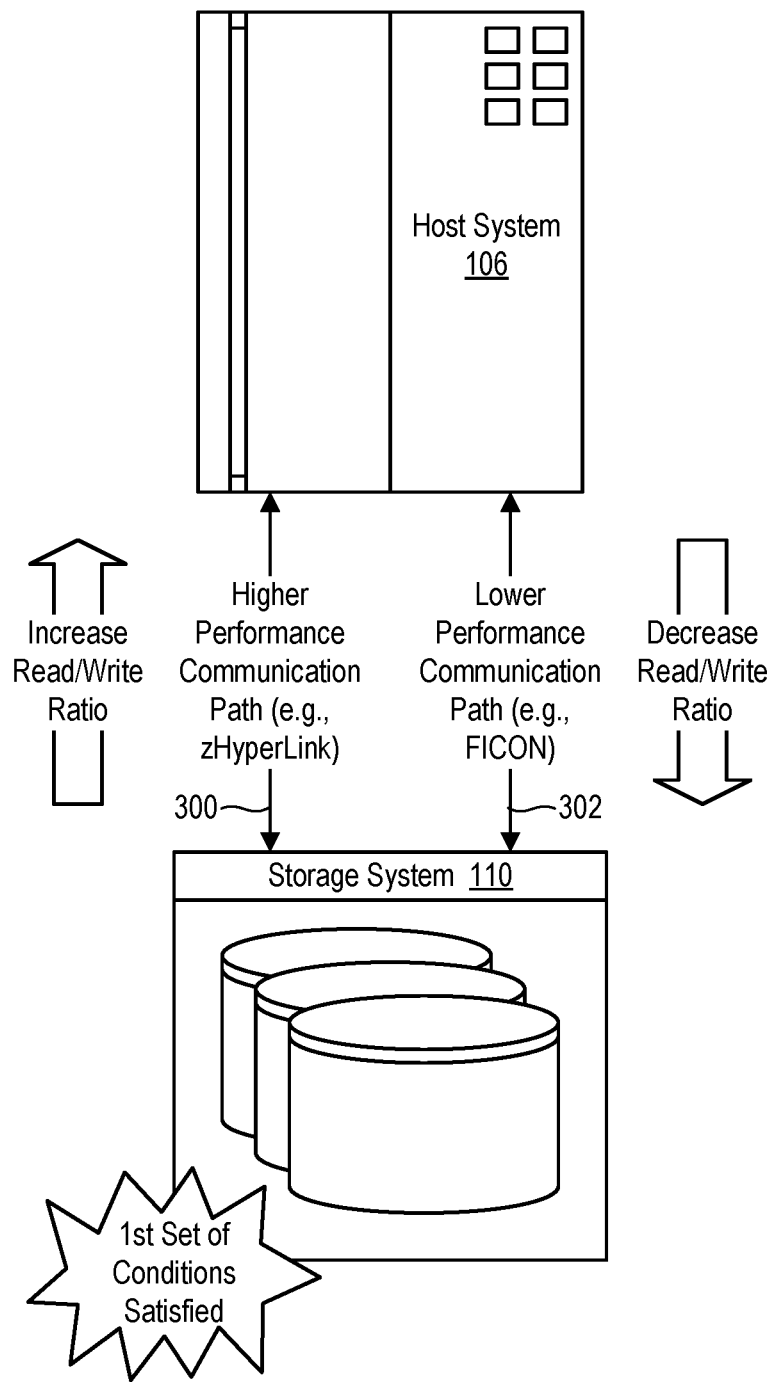
FIG. 4 is a high-level block diagram showing, when a first set of conditions is satisfied, increasing a ratio of reads to writes over a higher performance communication path, and decreasing a ratio of reads to writes over a lower performance communication path.
Figure 5:
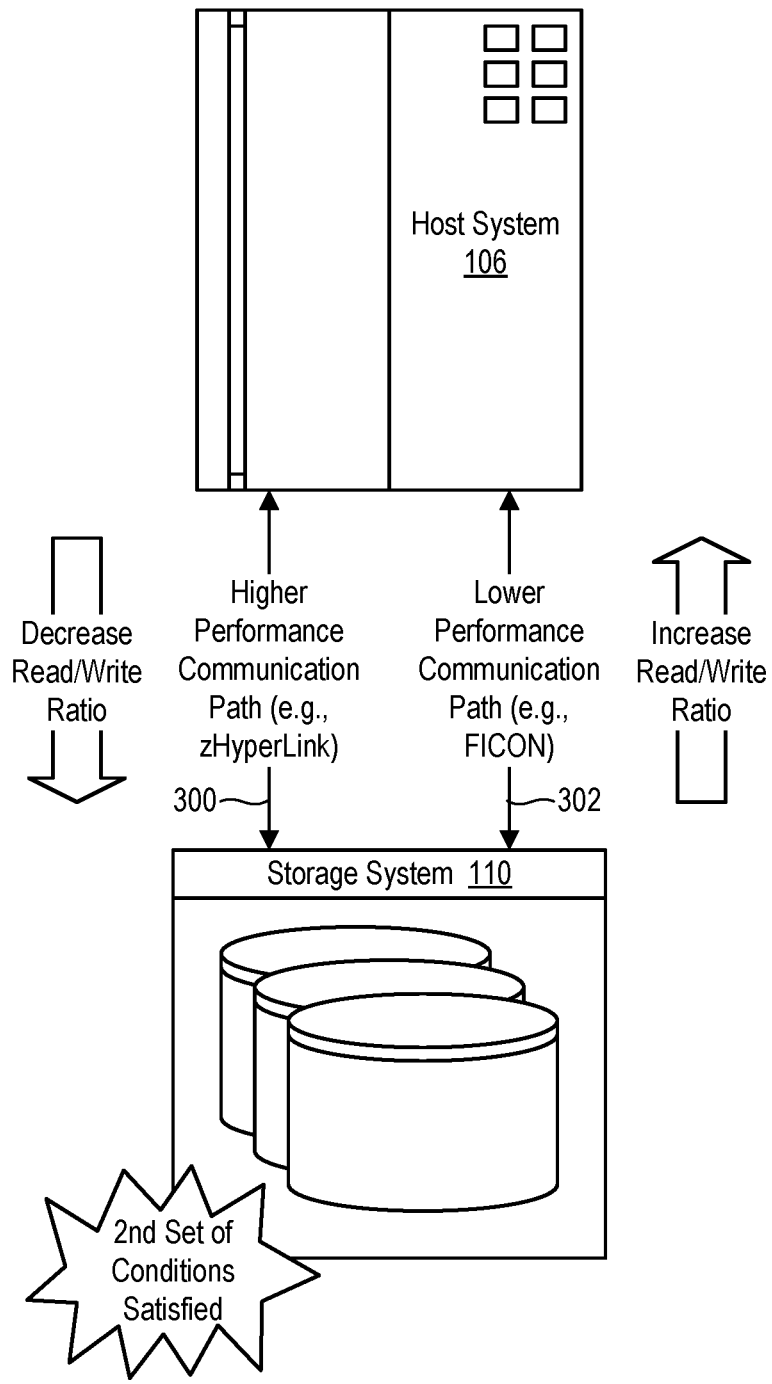
FIG. 5 is a high-level block diagram showing, when a second set of conditions is satisfied, decreasing a ratio of reads to writes over a higher performance communication path, and increasing a ratio of reads to writes over a lower performance communication path.

Referring to FIGS. 4 and 5, different conditions may exist on a storage system 110, such as the IBM DS8000™ enterprise storage system 110, that may make executing read requests and write requests more efficient on different communication paths 300, 302. Functionality may be provided to detect such conditions and communicate this information to a host system 106 so that the host system 106 can use the most efficient communicate path 300, 302 to complete an I/O operation. For example, it generally does not make sense to use a higher performance communication path 300 only to have an I/O operation fail or timeout and then have to retry the I/O operation using the lower performance communication path 302. In such cases, it would have been better and more efficient to use the lower performance communication path 302 in the first place.

Systems and methods in accordance with the invention may monitor various conditions on the storage system 110. These conditions may, in many cases, indicate the availability or utilization of resources on the storage system 110. Certain conditions may indicate that it would be more efficient to execute read requests over a certain communication path 300, 302, while other conditions may indicate that it would be more efficient to execute write requests over the same communication path 300, 302. If a first set of conditions are satisfied (indicating certain resources are available, unavailable, scarce, plentiful, etc.), functionality in accordance with the invention may increase a ratio of read requests to write requests that are transmitted over a higher performance communication path 300 (e.g., a zHyperLink communication path 300) and reduce a ratio of read requests to write requests that are transmitted over a lower performance communication path 302 (e.g., a zHPF communication path 302), as shown in FIG. 4. Similarly, if a second set of conditions are satisfied (indicating certain resources are available, unavailable, scarce, plentiful, etc.), functionality in accordance with the invention may decrease a ratio of read requests to write requests that are transmitted over a higher performance communication path 300 (e.g., a zHyperLink communication path 300) and increase a ratio of read requests to write requests that are transmitted over a lower performance communication path 302 (e.g., a zHPF communication path 302), as shown in FIG. 5.

Figure 6:
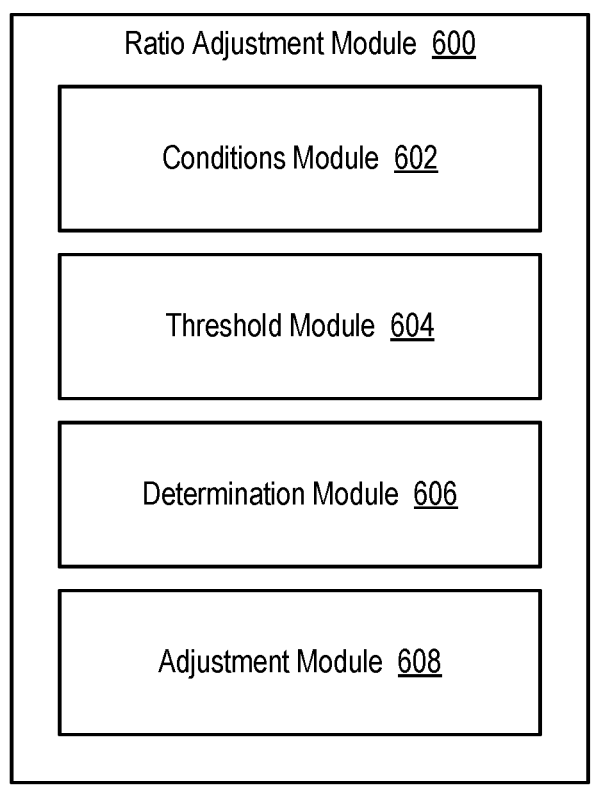
FIG. 6 is a high-level block diagram showing a ratio adjustment module for adjusting a ratio of reads and writes over a communication path.

Referring to FIG. 6, in certain embodiments, a ratio adjustment module 600 may be provided to adjust the ratio of read requests and write requests that are transmitted over the communication paths 300, 302. As shown, the ratio adjustment module 600 may include various sub-modules to provide various features and functions. The ratio adjustment module 600 and associated sub-modules may be implemented in hardware, software, firmware, or combinations thereof. The sub-modules are presented by way of example and not limitation. More or fewer sub-modules may be provided in different embodiments. For example, the functionality of some sub-modules may be combined into a single or smaller number of sub-modules, or the functionality of a single sub-module may be distributed across several sub-modules.

As shown, the ratio adjustment module 600 includes one or more of a conditions module 602, threshold module 604, determination module 606, and adjustment module 608. The conditions module 602 may be configured to establish one or more conditions that may be monitored and used to determine whether to increase or reduce utilization of a particular I/O processing technique. The conditions may include, for example, read cache hit ratio, read response times, write response times, queuing of segments in non-volatile storage of the storage controller 200, an amount or percentage of read request rejections, an amount or percentage of write request rejections, and the like. In general, the conditions may be indicators of resource utilization and availability within the storage system 110. The availability or scarcity of certain resources may favor execution of read requests over certain communication paths 300, 302, while the availability or scarcity of other resources may favor execution of write requests over certain communication paths 300, 302.

The threshold module 604 may establish thresholds for the conditions established by the conditions module 602. In general, the thresholds may indicate when a condition (e.g., cache hit ratio, response time, rejection rate, etc.) has reached a limit, which may in turn affect the performance of read requests and/or write requests. In such cases, it may be advantageous to adjust the ratio of read requests and write requests that are transmitted over certain communication paths 300, 302 to optimize the system. The thresholds may be expressed in terms of a number, percentage, comparison relative to another metric, or the like.

Once the conditions and associated thresholds are established, the determination module 606 may monitor the storage system 110 and determine which thresholds have and have not been reached, and thus, which conditions have and have not been satisfied. The adjustment module 608 may make adjustments based on which conditions have been satisfied. For example, if a first set of conditions are satisfied, the adjustment module 608 may increase a ratio of reads relative to writes over a higher performance communication path 300 and decrease a ratio of reads relative to writes over a lower performance communication path 302. Similarly, if a second set of conditions are satisfied, the adjustment module 608 may decrease a ratio of reads relative to writes over a higher performance communication path 300 and increase a ratio of reads relative to writes over a lower performance communication path 302.

Figure 7:
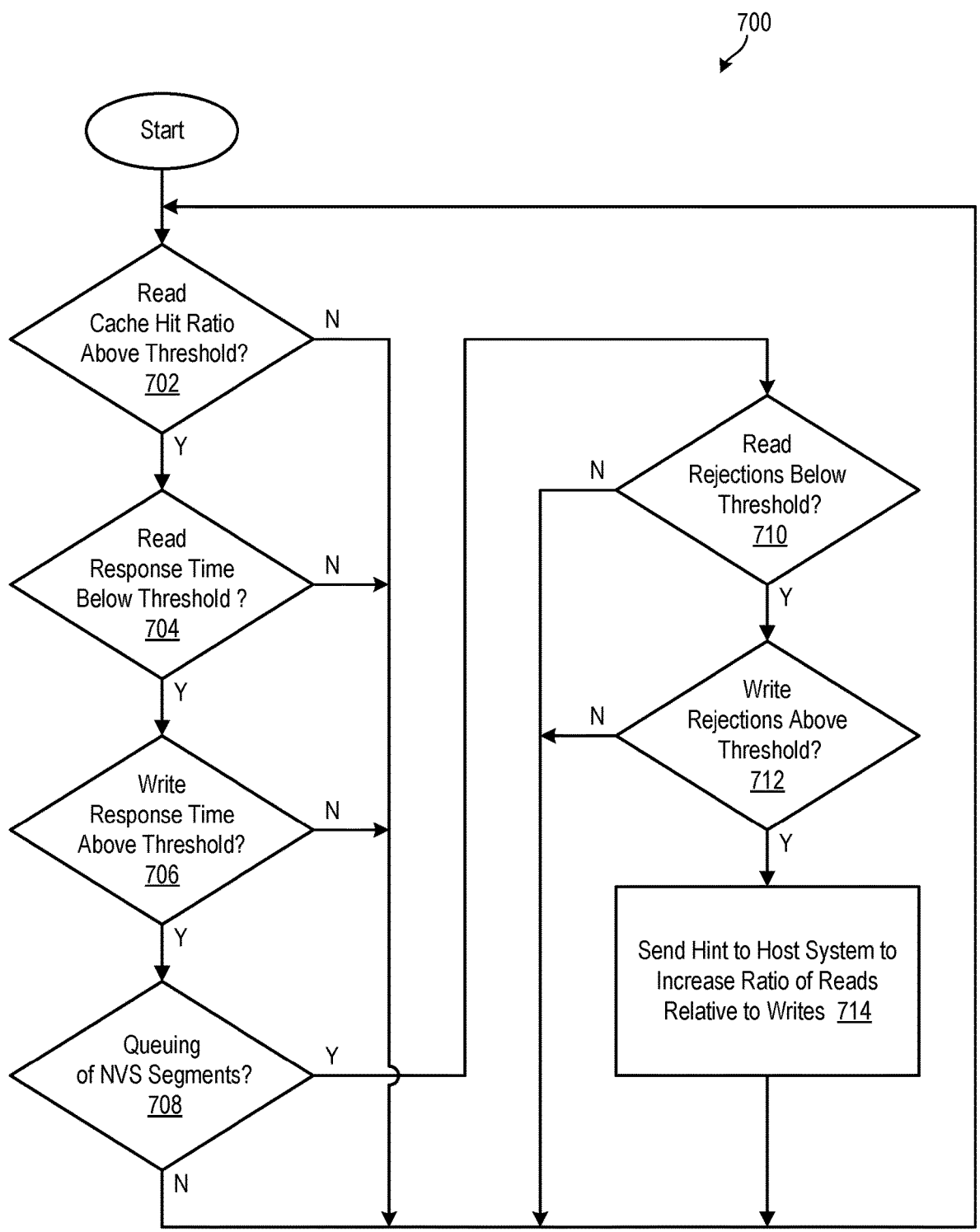
FIG. 7 is a process flow diagram showing one embodiment of a method for increasing a ratio of reads relative to writes.

FIG. 7 is a process flow diagram showing one embodiment of a method 700 for increasing a ratio of reads relative to writes over a higher performance communication path 300, such as a zHyperLink communication path 300. Such a method 700 may be executed by a storage system 110 such as that illustrated in FIG. 2. As shown, the method 700 tests 702, 704, 706, 708, 710, 712, for a plurality of conditions. In the illustrated embodiment, the method 700 determines 702 whether a read cache hit ratio is above a selected threshold (e.g., 80 percent); determines 704 whether read response times are below a selected threshold (e.g., 30 microseconds); determines 706 whether write response times are above a selected threshold (e.g., 50 microseconds); determines 708 whether non-volatile storage (NVS) in the storage system 110 is queuing NVS segments (i.e., the NVS, which caches write data, is currently full and cannot receive additional write data without freeing up space); determines 710 whether the percentage of reads that are rejected is below a selected threshold (e.g., 20 percent); and determines 712 whether the percentage of writes that are rejected is above a selected threshold (e.g., 30 percent).

In the illustrated embodiment, if all of the conditions are satisfied, the method 700 sends 714 a hint to the host system 106 to, when transferring data over the higher performance communication path 300, prefer read requests over write requests and/or increase the ratio of read requests relative to write requests. In other embodiments, satisfaction of some subset of the illustrated conditions, or satisfaction of additional or different conditions, may cause the method 700 to send 714 a hint to prefer read requests over write requests and/or increase the ratio of read requests relative to write requests.

Figure 8:
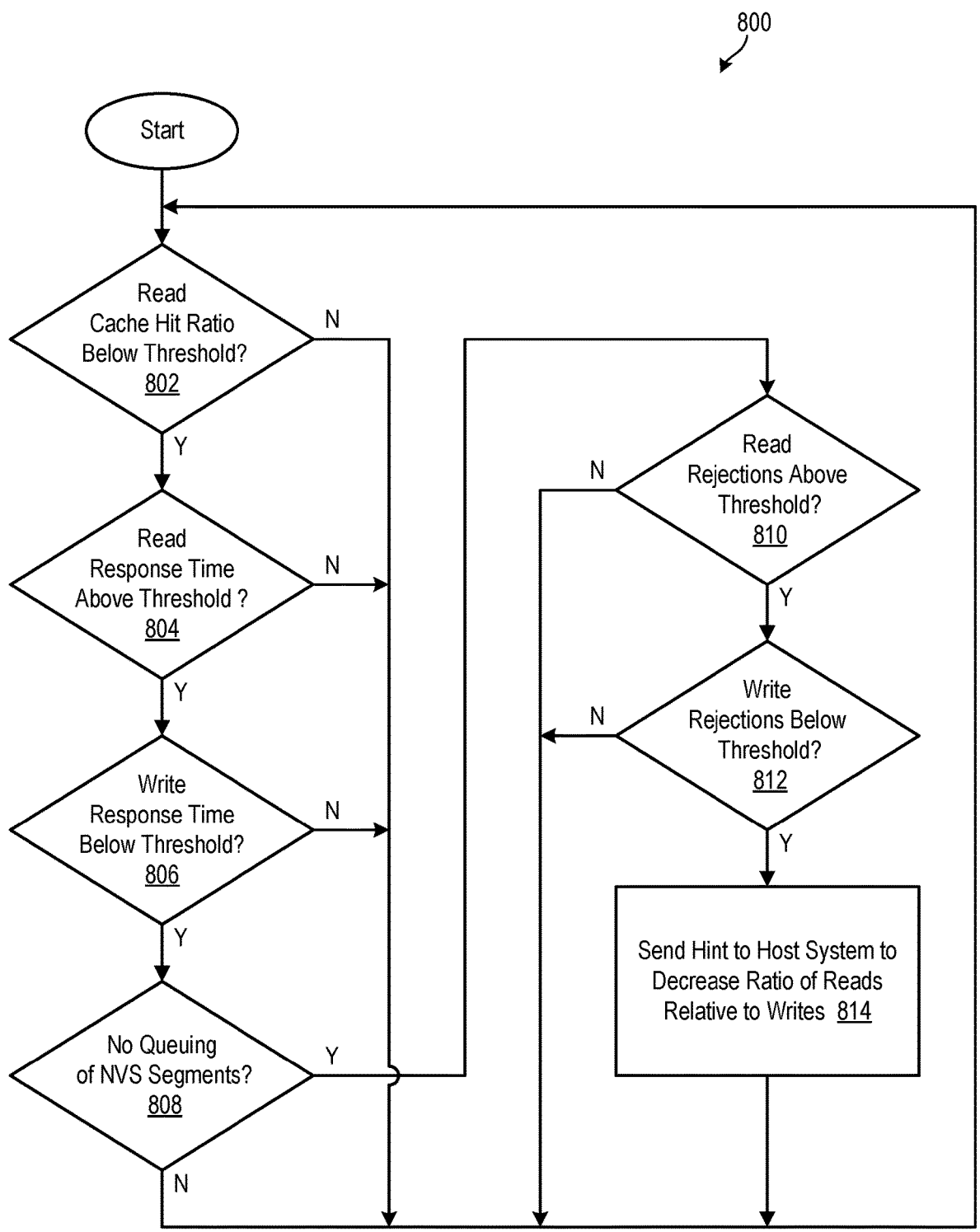
FIG. 8 is a process flow diagram showing one embodiment of a method for decreasing a ratio of reads relative to writes.

FIG. 8 is a process flow diagram showing one embodiment of a method 800 for decreasing a ratio of reads relative to writes over a higher performance communication path 300, such as a zHyperLink communication path 300. Such a method 800 may be executed by a storage system 110 such as that illustrated in FIG. 2. As shown, the method 800 tests 802, 804, 806, 808, 810, 812, for a plurality of conditions. In the illustrated embodiment, the method 800 determines 802 whether a read cache hit ratio is below a selected threshold (e.g., 70 percent); determines 804 whether read response times are above a selected threshold (e.g., 30 microseconds); determines 806 whether write response times are below a selected threshold (e.g., 50 microseconds); determines 808 whether non-volatile storage (NVS) in the storage system 110 is not queuing NVS segments (i.e., the NVS, which caches write data, is not full and can receive additional write data); determines 810 whether the percentage of reads that are rejected is above a selected threshold (e.g., 30 percent); and determines 812 whether the percentage of writes that are rejected is below a selected threshold (e.g., 20 percent).

In the illustrated embodiment, if all of the conditions are satisfied, the method 800 sends 814 a hint to the host system 106 to, when transferring data over the higher performance communication path 300, prefer write requests over read requests and/or decrease the ratio of read requests relative to write requests. In other embodiments, satisfaction of some subset of the illustrated conditions, or satisfaction of additional or different conditions, may cause the method 800 to send 814 a hint to prefer write requests over read requests and/or decrease the ratio of read requests relative to write requests.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for dynamically balancing I/O workload, the method comprising:
   transmitting, from a host system to a storage system, read requests and write requests over a higher performance communication path and a lower performance communication path;
   determining whether a first set of conditions and a second set of conditions are satisfied on at least one of the host system and the storage system;
   upon determining that the first set of conditions is satisfied, increasing a first ratio of read requests to write requests that are transmitted over the higher performance communication path and decreasing a second ratio of read requests to write requests that are transmitted over the lower performance communication path; and
   upon determining that the second set of conditions is satisfied, decreasing the first ratio of read requests to write requests that are transmitted over the higher performance communication path and increasing the second ratio of read requests to write requests that are transmitted over the lower performance communication path.

2. The method of claim 1, wherein the higher performance communication path is a zHyperLink communication path.

3. The method of claim 1, further comprising providing, from the storage system to the host system, a hint indicating whether to increase or decrease at least one of the first ratio and the second ratio.

4. The method of claim 1, further comprising providing, from the storage system to the host system, information indicating whether the first and second sets of conditions are satisfied.

5. The method of claim 1, wherein determining whether the first and second sets of conditions are satisfied comprises determining whether a read cache hit ratio is above or below a selected threshold.

6. The method of claim 1, wherein determining whether the first and second sets of conditions are satisfied comprises determining whether at least one of a read response time and a write response time is above or below a selected threshold.

7. The method of claim 1, wherein determining whether the first and second sets of conditions are satisfied comprises determining whether at least one of read rejections and write rejections are above or below a selected threshold.

8. A computer program product for dynamically balancing I/O workload, the computer program product comprising a non-transitory computer-readable storage medium having computer-usable program code embodied therein, the computer-usable program code configured to perform the following when executed by at least one processor:
   transmit, from a host system to a storage system, read requests and write requests over a higher performance communication path and a lower performance communication path;
   determine whether a first set of conditions and a second set of conditions are satisfied on at least one of the host system and the storage system;
   upon determining that the first set of conditions is satisfied, increase a first ratio of read requests to write requests that are transmitted over the higher performance communication path and decrease a second ratio of read requests to write requests that are transmitted over the lower performance communication path; and
   upon determining that the second set of conditions is satisfied, decrease the first ratio of read requests to write requests that are transmitted over the higher performance communication path and increase the second ratio of read requests to write requests that are transmitted over the lower performance communication path.

9. The computer program product of claim 8, wherein the higher performance communication path is a zHyperLink communication path.

10. The computer program product of claim 8, wherein the computer-usable program code is further configured to provide, from the storage system to the host system, a hint indicating whether to increase or decrease at least one of the first ratio and the second ratio.

11. The computer program product of claim 8, wherein the computer-usable program code is further configured to provide, from the storage system to the host system, information indicating whether the first and second sets of conditions are satisfied.

12. The computer program product of claim 8, wherein determining whether the first and second sets of conditions are satisfied comprises determining whether a read cache hit ratio is above or below a selected threshold.

13. The computer program product of claim 8, wherein determining whether the first and second sets of conditions are satisfied comprises determining whether at least one of a read response time and a write response time is above or below a selected threshold.

14. The computer program product of claim 8, wherein determining whether the first and second sets of conditions are satisfied comprises determining whether at least one of read rejections and write rejections are above or below a selected threshold.

15. A system for dynamically balancing I/O workload, the system comprising:
   at least one processor;
   at least one memory device operably coupled to the at least one processor and storing instructions for execution on the at least one processor, the instructions causing the at least one processor to:
      transmit, from a host system to a storage system, read requests and write requests over a higher performance communication path and a lower performance communication path;
      determine whether a first set of conditions and a second set of conditions are satisfied on at least one of the host system and the storage system;
      upon determining that the first set of conditions is satisfied, increase a ratio of read requests to write requests that are transmitted over the higher performance communication path and decrease a second ratio of read requests to write requests that are transmitted over the lower performance communication path; and
      upon determining that the second set of conditions is satisfied, decrease the ratio of read requests to write requests that are transmitted over the higher performance communication path and increase the second ratio of read requests to write requests that are transmitted over the lower performance communication path.

16. The system of claim 15, wherein the higher performance communication path is a zHyperLink communication path.

17. The system of claim 15, wherein the instructions further cause the at least one processor to provide, from the storage system to the host system, a hint indicating whether to increase or decrease at least one of the first ratio and the second ratio.

18. The system of claim 15, wherein the instructions further cause the at least one processor to provide, from the storage system to the host system, information indicating whether the first and second sets of conditions are satisfied.

19. The system of claim 15, wherein determining whether the first and second sets of conditions are satisfied comprises determining whether a read cache hit ratio is above or below a selected threshold.

20. The system of claim 15, wherein determining whether the first and second sets of conditions are satisfied comprises determining whether at least one of a read response time and a write response time is above or below a selected threshold.

* * * * *